(12) United States Patent
Chavez

(10) Patent No.: US 6,345,830 B1
(45) Date of Patent: Feb. 12, 2002

(54) PORTABLE/RETRACTABLE BEVERAGE CART

(76) Inventor: Danny J. Chavez, 4808 Nevilly Way, Marietta, GA (US) 30066

( * ) Notice: Subject to any disclaimer, the term of this patent is extended or adjusted under 35 U.S.C. 154(b) by 0 days.

(21) Appl. No.: 09/501,971

(22) Filed: Feb. 10, 2000

(51) Int. Cl.$^7$ ................................................ B62B 1/00
(52) U.S. Cl. ............................. 280/47.28; 280/47.17; 280/47.19; 280/47.29; 206/203
(58) Field of Search .......................... 280/47.27, 47.28, 280/47.29, 651, 652, 655, 654, 47.19, 47.18, 47.17, 47.26, 47.35; 206/203, 180

(56) References Cited

U.S. PATENT DOCUMENTS

| | | | | |
|---|---|---|---|---|
| 2,428,853 A | * | 10/1947 | Procter | 280/47.19 |
| D180,868 S | * | 8/1957 | Diehl | D34/24 |
| 3,116,936 A | * | 1/1964 | Magarian | 280/47.19 |
| 4,448,434 A | * | 5/1984 | Anderson | 280/47.28 |
| 4,865,346 A | * | 9/1989 | Carlile | 280/47.19 |
| D303,883 S | * | 10/1989 | Higson et al. | D6/429 |
| 4,993,727 A | * | 2/1991 | Vom Braucke et al. | 280/655 |
| D322,917 S | * | 1/1992 | Morris et al. | D3/313 |
| 5,845,915 A | * | 12/1998 | Wilson | 280/47.19 |
| 5,863,055 A | * | 1/1999 | Kasravi et al. | 280/47.29 |
| 5,893,572 A | * | 4/1999 | Parks | 280/47.18 |
| 6,047,866 A | * | 4/2000 | Brown | 222/608 |

* cited by examiner

Primary Examiner—J. J. Swann
Assistant Examiner—James S. McClellan
(74) Attorney, Agent, or Firm—William B. Noll

(57) ABSTRACT

A portable and retractable cart primarily for transporting and dispensing beverages at selected mobile sites, then retractable to a relatively thin profile for easy storage. The cart comprises a planar, U-shaped frame member, a pair of pivotal wheels at the frame free ends, and first and second hinged and supportable platforms for transporting and dispensing the beverages.

3 Claims, 2 Drawing Sheets

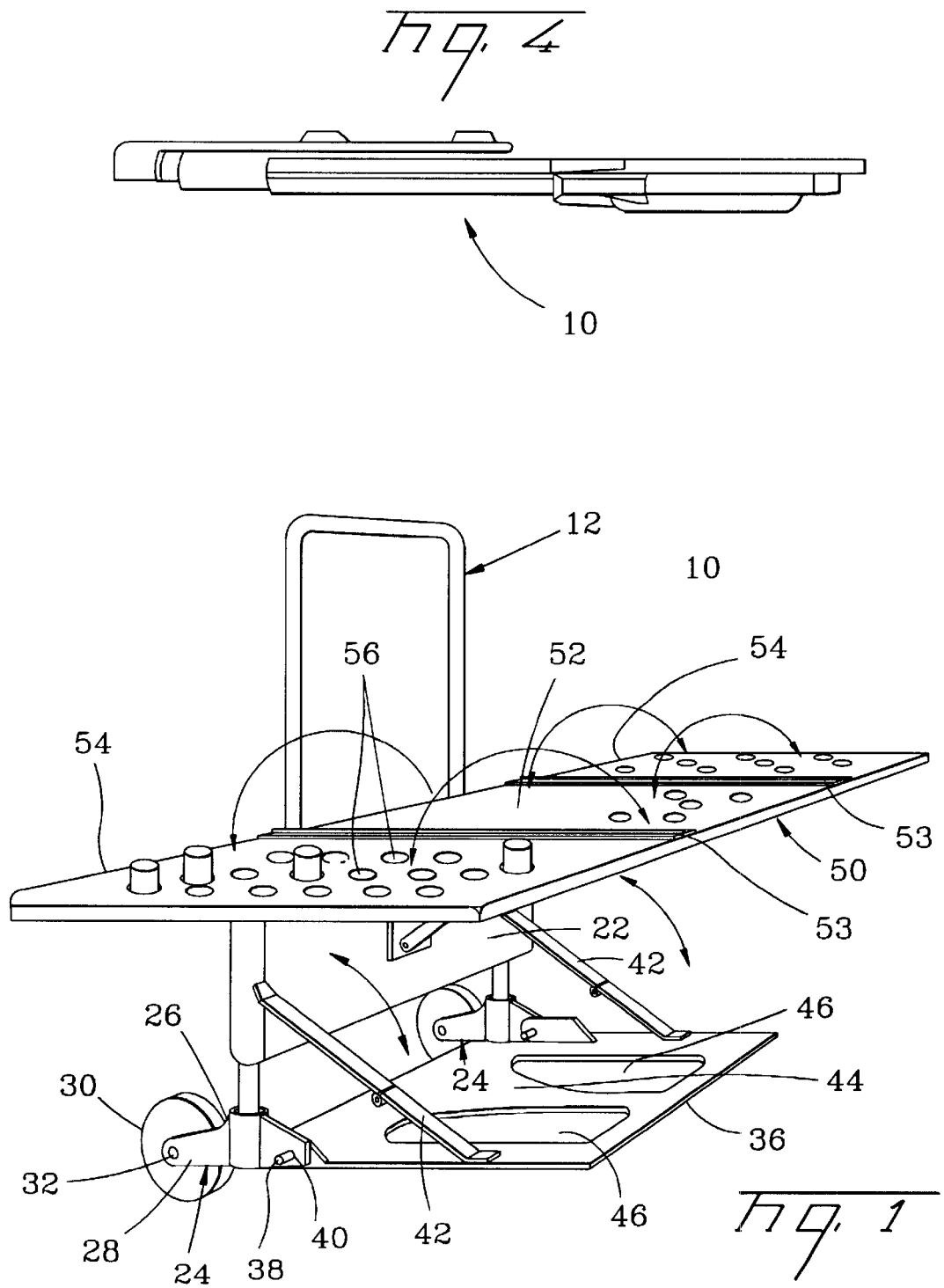

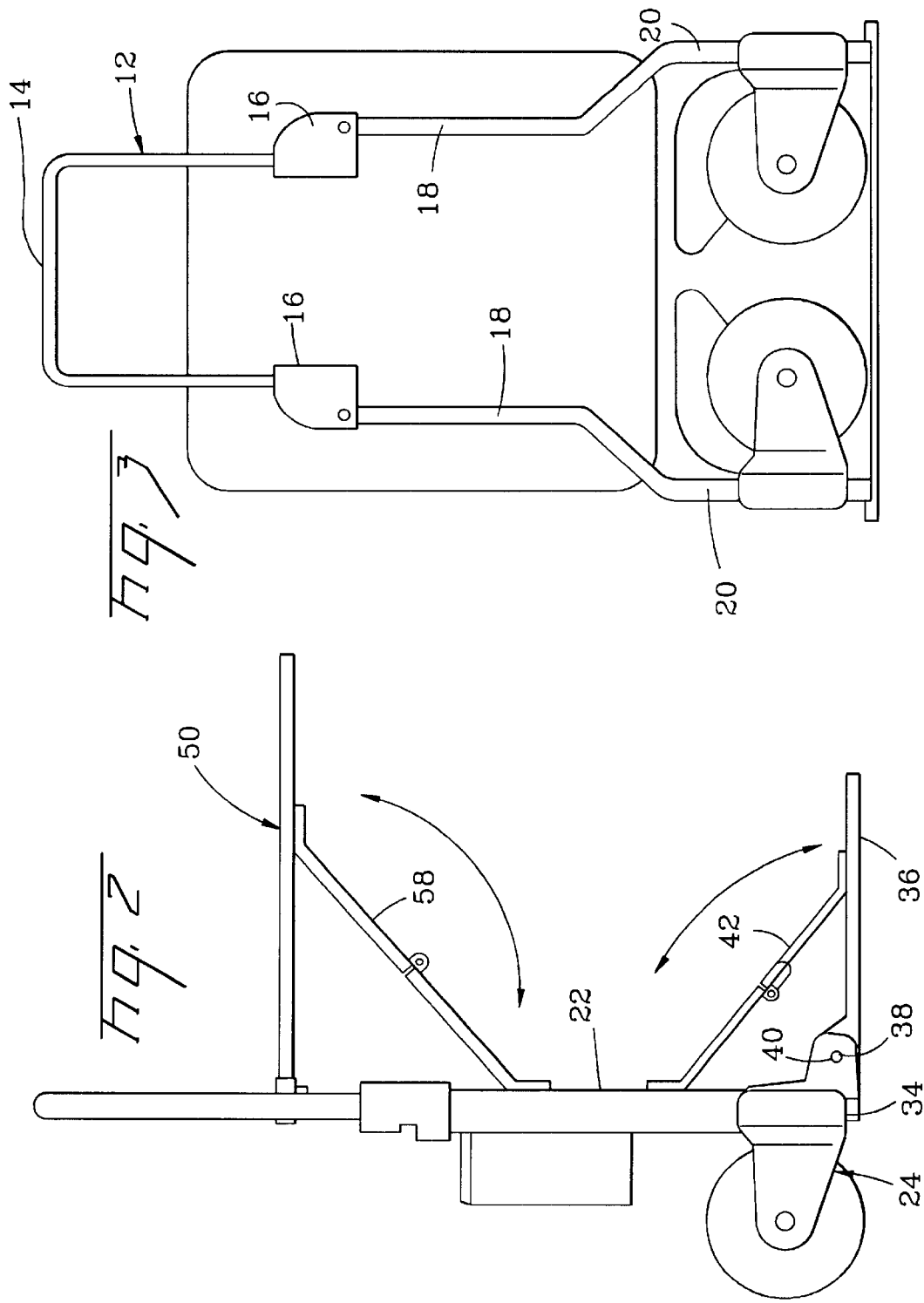

PORTABLE/RETRACTABLE BEVERAGE CART

FIELD OF THE INVENTION

This invention is directed to the field of portable manually wheeled carts, more particularly for transporting and delivering quantities of beverages.

BACKGROUND OF THE INVENTION

The present invention is directed to a portable and retractable beverage cart that may be readily transported, by manual means, along a planar surface or up and down steps. The cart, retractable to a thin profile for conveniently transporting in the trunk of an automobile, for example, includes a transporting surface for bulk items, and a transporting surface for plural individual beverage products.

There are a number of prior art and commercial devices that offer limited utility in transporting bulk and individual beverage containers. Certain of the prior art is reflected by the following:

a.) U.S. Pat. No. 3,027,174, to Garbarino, teaches a portable and nestable platform truck. More particularly, the truck thereof relates to a hand-pushed type of truck which may be used to move goods over relatively short distances.

b.) U.S. Pat. No. 3,873,115, to Shiflet, is directed to a portable stowage rack for transporting and displaying beverage containers, such as soft drink bottles, arranged in a plurality of vertically stacked layers. The stowage rack includes a back member, a base inclined toward the rear wall, a plurality of sheet-like members secured to the back member and extending therefrom to overlie each layer of bottles except the top layer, and a wire yoke supported on the back member and extending around the periphery of the upper layer of bottles to retain them in the stacked condition and against lateral movement therefrom.

c.) U.S. Pat. No. 5,048,857, to Stevens, relates an integrated food service cart system having a pair of upper panels and a pair of lower shelves supported on the frame pivotal between horizontal service positions and vertical storage positions. The upper panels have spaces for holding chafer pans therein and pivotable support members extending below the spaces for holding chafer heating elements therein. The support members pivot into the spaces when the panels and shelves are pivoted to the vertical positions, thus assuming a slim profile for storage. Preferred features include a collapsible food shelf or coffee urn bridge mountable on the frame, clips on the undersides of the lower shelves for storing the chafer pans, and a collapsible awning assembly having a vertical support tubes, risers telescoped into the support tubes, awning heads pivotably mounted on the risers with labyrinthine head bars extending between them, support arms pivotably mounted on the risers, stretcher bars mounted to the ends of the support arms, and an awning membrane stretched across the stretcher bars and through the head bars.

While the foregoing prior art offers some conveniences to an operator in transporting selected articles, none provide the utility and convenience of the beverage cart of this invention. The manner by which this invention brings to an operator the unique utilitarian features hereof will become clearer to those skilled in the art from the following description, particularly when read in conjunction with the accompanying drawings.

SUMMARY OF THE INVENTION

This invention is directed to a hand truck or portable and retractable cart for use primarily in transporting and dispensing beverages in bulk or individual containers. The cart comprises a U-shaped, planarly aligned frame having a pair of free ends with a wheel, at each free end, pivotal from an operable position perpendicular to the plane of the frame to a retracted position aligned with the frame. Further, first and second platforms are pivotally mounted to the frame movable from an inoperative position adjacent the frame to a temporarily locked position perpendicular thereto. The first platform includes a pair of openings to provide relief to the wheels in the retracted position, and the second platform includes at least one hinged section.

Accordingly, an object of this invention is to provide a beverage cart that can easily transport and dispense beverages at selected locations.

Another object hereof is the provision of a beverage cart that is readily retractable to reveal a thin profile for convenient storage and transportation, such as in the trunk of an automobile.

These and other objects will become more apparent in the following drawings and specification.

BRIEF DESCRIPTION OF THE DRAWINGS

FIG. 1 is a perspective view of the portable and retractable beverage cart according to the present invention.

FIG. 2 is a side view of the erected beverage cart of FIG. 1.

FIG. 3 is a rear view of the retracted beverage cart of this invention.

FIG. 4 is a side view, illustrating a relatively thin profile, for the retracted beverage cart of FIG. 3.

DETAILED DESCRIPTION OF THE PREFERRED EMBODIMENT

The present invention relates to a portable and retractable cart or hand truck, primarily for transporting and dispensing selected beverages at a variety of on-site locations. The invention will now be described with regard to the several Figures, where like reference numerals represent like components or features throughout the various views.

FIG. 1 is a perspective view illustrating the beverage cart 10 of this invention, showing the beverage cart is an erected position as it might be used for dispensing beverages at a desired on-site location. As further seen in FIG. 3, the beverage cart 10 comprises a U-shaped frame 12, preferably of tubular material, such as aluminum or steel, where the frame may consist of a U-shaped handle portion 14, a connector member 16 at each free end of the handle portion, and a pair of leg extensions 18 diverging into parallel sections 20. Whether a continuous frame or a sectioned frame, the frame is aligned in a single plane.

Extending between and secured to the respective parallel sections 20 is a panel 22, thereby fixing the distance between the sections 20 and providing stability to the cart. At the open end of the frame 12, or parallel sections 20, are mounted a pair of pivotal wheel assemblies 24 consisting of a housing 26 with a pair of legs 28 between which is a freely rotatable wheel 30 on axle 32. FIG. 1 illustrates the wheel assemblies 24 in the operable position, whereas in FIG. 3 the wheel assemblies 24 are shown in the retracted or inoperable position, i.e. pivotal with the wheels in the plane of the frame.

Mounted for pivotal movement at the frame free ends 34 is a first platform 36. The free ends 34 may include an outwardly extending pin 38 for engaging the end aperture 40 forming the joint pivot. To support the first platform 36 in transporting items, a pair of collapsible and lockable brackets 42 are provided, where such brackets extend between the respective frame sides and forward of the platform face 44. In order to obtain a thin profile in the retracted position, the platform face 44 is provided with a pair of cut-outs 46 to override the pivoted wheels 30 when the platform is pivoted upward, see FIGS. 2 and 3.

As seen in FIGS. 1, 2 and 3, the frame 12 is fiber provided with a downwardly pivoting, second platform 50, where a preferred embodiment includes a pivoting middle panel 52 and a pair of hinged panels 54, where the outer panels 54 are hinged 53 to the middle panel 52. Since the second platform 50 represents an ideal place for holding and dispensing beverages, the three panels may be provided with an array of openings 56 sized to receive a conventional beverage container, as known in the art. If used in a team or other group activity, where spreading of germs may be a concern, the various openings may be numbered or given other indicia to identify use by a specific individual. To support the second platform 50, a collapsible and lockable support bracket 58 is provided, where said support bracket extends between the underside of the middle panel 52 and fixed panel 22.

A unique feature of the beverage cart 12 is its construction that allows one to retract the cart into a relatively thin profile, see FIG. 4. By this arrangement, one can easily retract the cart and place it into one's automobile truck.

It is recognized that changes, modifications and variations may be made to the portable and retractable beverage cart of this invention, particularly by those skilled in the art, upon reading these specifications. Accordingly, no limitation is intended to be imposed on this invention except as set forth in the following claims.

What is claimed is:

1. A portable and retractable hand cart comprising a U-shaped, planarly aligned frame having a pair of free ends, a wheel at each said free end, pivotal from an operable position perpendicular to the plane of said frame to a retracted position aligned with said frame, first and second platforms pivotally mounted to said-frame and movable from an inoperative position adjacent said frame to a temporarily locked position perpendicular thereto, said first platform including a pair of openings to provide relief to said wheels in a pivoted and retracted position to place said wheels in the plane of said first platform, said second platform including at least one hinged section, a panel extending between the legs of said U-shaped frame between said platforms and a collapsible support member extending between said panel and said second platform, and said second platform includes an array of openings, where each said opening is sized to conveniently receive and retain a beverage container.

2. The portable and retractable hand cart according to claim 1, wherein said second platform has two hinged sections.

3. The portable and retractable hand cart according to claim 1, wherein said openings are identified by different indicia.

* * * * *